United States Patent [19]
Lee et al.

[11] Patent Number: 5,513,051
[45] Date of Patent: Apr. 30, 1996

[54] IMAGE SIGNAL RECORDING AND REPRODUCING APPARATUS HAVING A QUASI-FIXED HEAD

[75] Inventors: Jin-Koo Lee; Kye-Chul Choi, both of Seoul, Rep. of Korea

[73] Assignee: Daewoo Electronics Co., Ltd., Seoul, Rep. of Korea

[21] Appl. No.: 176,478

[22] Filed: Dec. 29, 1993

[30] Foreign Application Priority Data

Feb. 5, 1993 [KR] Rep. of Korea ............... 93-01594

[51] Int. Cl.$^6$ ............................................. G11B 21/04
[52] U.S. Cl. ...................... 360/77.16; 360/24; 360/26; 360/63; 360/107; 360/75
[58] Field of Search ......................... 360/22, 24, 26, 360/62, 63, 75, 77.12, 77.13, 77.16, 107, 109, 113, 121

[56] References Cited

U.S. PATENT DOCUMENTS

| | | |
|---|---|---|
| 3,702,996 | 11/1972 | Wolfer et al. .................. 360/26 |
| 3,860,965 | 1/1975 | Voegeli . |
| 3,864,751 | 2/1975 | Beaulieu et al. . |
| 3,913,142 | 10/1975 | Kroon . |
| 3,913,143 | 10/1975 | Schneider et al. . |
| 3,979,775 | 9/1976 | Schwarz . |
| 3,986,210 | 10/1976 | Sugaya et al. ................. 360/123 |
| 3,987,488 | 10/1976 | Kanai et al. . |
| 4,103,315 | 7/1978 | Hempstead et al. . |
| 4,158,213 | 6/1979 | Griffith . |
| 4,198,662 | 4/1980 | Schopper ..................... 360/63 X |
| 4,663,685 | 5/1987 | Tsang . |
| 4,750,060 | 6/1988 | Nakazawa et al. ............ 360/63 X |
| 4,816,948 | 3/1989 | Kamo et al. . |
| 5,023,548 | 6/1991 | McMorran ..................... 360/31 X |

FOREIGN PATENT DOCUMENTS

| | | |
|---|---|---|
| 1468368 | 3/1977 | United Kingdom . |
| 1468551 | 3/1977 | United Kingdom . |

*Primary Examiner*—Aristotelis Psitos
*Assistant Examiner*—James L. Habermehl
*Attorney, Agent, or Firm*—Beveridge, DeGrandi, Weilacher & Young

[57] ABSTRACT

An image signal recording and reproducing apparatus comprises a head array having a plurality of head gaps for recording and reproducing the image; a piezoelectric actuator having a polarization direction and for moving the head array downwards and upwards in a width direction of a track in accordance with input of a driving voltage; a phase comparator for generating a phase control signal in accordance with a phase difference between the head array and the track; a unit for outputting the driving voltage to the actuator in accordance with the phase control signal; and a signal processing unit for recording and reproducing the image signal on and from the track by the head array.

9 Claims, 4 Drawing Sheets

FIG. 1C
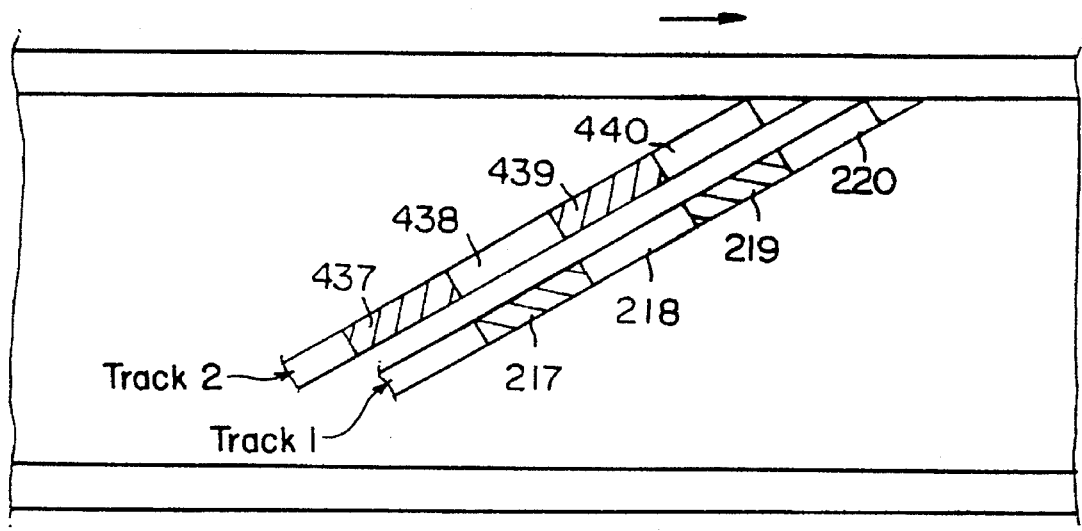
FIG. 2A
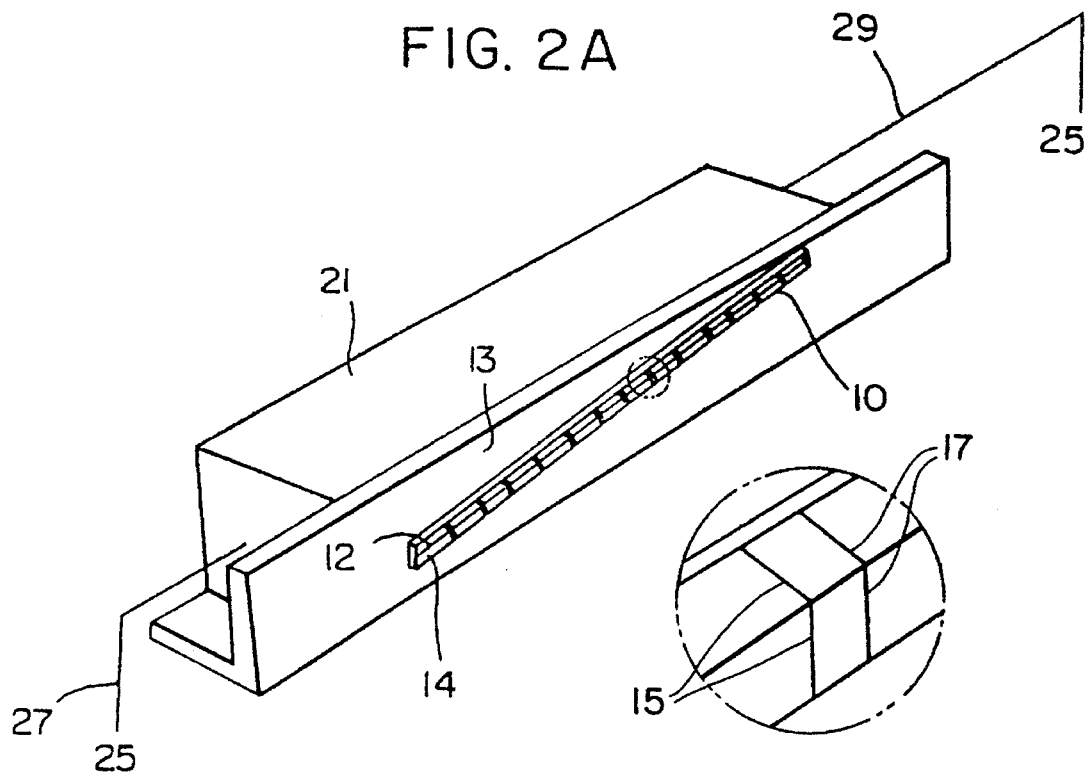
FIG. 2B

IMAGE SIGNAL RECORDING AND REPRODUCING APPARATUS HAVING A QUASI-FIXED HEAD

BACKGROUND OF THE INVENTION

1. Field of the Invention

The present invention relates to an image signal recording and reproducing apparatus, and more particularly to an apparatus for recording and reproducing a plurality of lines of an image at the same time by use of a vertical scan mechanism of a head array having a plurality of magnetic head gaps and a signal processing apparatus thereof.

2. Description of the Prior Art

Generally, a magnetic recording and reproducing mechanism of a Video Cassette Recorder(VCR) or an Audio Tape Recorder is constituted in order to slide a recording medium, for example, a magnetic tape or a magnetic disk, on gaps of a magnetic head. In comparison with an audio head, a video head is installed around a rotating drum since a relative speed between recording media and the magnetic head should be high in the VCR. Therefore, a construction of the rotating drum is complicated and the size thereof becomes bigger.

In this case, a recording format is made such that image signals are usually recorded in largest portion of the tape in the widthwise direction and audio and control signals are recorded at edge portions of the tape in the longitudinal direction. A helical scanning method performs scanning of of a tape by a drum of a VCR which is rotated at an angle respect to a moving direction of the tape while contacting the tape with the rotating drum. In such a case, the long tracks are formed slantwise on the width of the tape, and a plurality of signals, for example, the one field image signals, are recorded and reproduced sequentially on and from each of the tracks.

In a VCR system employing the typical helical-scan method, in order not to vary the time axis of an image signal during recording and reproducing mechanism, it is necessary to control the rotation of the drum stably. And in case of the reproducing mechanism, for obtaining an optimal value of a signal-to-noise ratio through an accurate tracking control, it is necessary to use a drum servo circuit for controlling a rotation of a drum and a capstan servo circuit for the accurate tracking control.

Magneto-Resistive heads(MR head) utilizing a magneto-resistive film have been used more and more widely.

The reproduction output of the above-mentioned MR heads does not depend on a relative speed between recording media and a magnetic head, and in particular a sensitivity higher than that of a conventional inductive head is obtained at a lower relative speed. In such a case, a constant magnetic field which is called a bias magnetic field is applied to the MR head from the exterior in order to improve a sensitivity and a linearity of a magneto-resistive head. A number of methods for realizing the bias magnetic field have been proposed as follows:

(1) a method by which a permanent magnet is arranged in the proximity of an MR film;

(2) a method by which a conductive film is placed in contact with an MR film; and (3) a method by which a soft magnetic film is arranged in the proximity of an MR film.

According to the development of these MR heads using a thin film technology, it could be possible to obviate the need for a head-to-tape high relative speed by use of a stationary multitrack magnetic head, whereby each of "line signals", which is called "line" hereinafter, of an image is simultaneously recorded in parallel on a relatively slow moving tape.

The technologies that are relevant to the MR head and multitrack magnetic head are disclosed in the following U.S. Pat. No. 4,816,948, issued Mar. 28, 1989, to Yoshihisa and U.S. Pat. No. 4,158,213 issued Jun. 12, 1979, to Grifis.

SUMMARY OF THE INVENTION

Accordingly, an object of the present invention is to provide a VCR system having a new quasi-fixed head in which head array having a plurality of head gaps scans a tape without a rotating drum.

Another object of the present invention is to provide an image signal recording and reproducing apparatus having a quasi-fixed head in which the image signals are simultaneously recorded and reproduced on and from the tracks of a tape by predetermined lines by using the quasi-fixed head array having a plurality of head gaps.

The head array in a form of thin film comprises a plurality of head gaps arrayed in two rows in a thin film by using a semiconductor manufacturing technology. The head array of the two rows is in contact with two tracks of helical-scann tracks of a tape. This head array is not installed on the head drum, and it scans the tape repeatedly by means of a driving means, and off-set correction between the head array and the tracks can be made during a movement of the tape. Accordingly, the head array of the present invention can record signals by scanning the tape helically, and reproduce the signals which have recorded by this head array.

BRIEF DESCRIPTION OF THE DRAWINGS

FIG. 1A, 1B and 1C are cross-sectional views showing a helical scanning mechanism of a quasi-fixed head array according to an embodiment of the present invention;

FIGS. 2A and 2B are views showing an arrangement of a plurality of head gaps in a quasi-fixed head array shown in FIG. 1A;

DETAILED DESCRIPTION OF THE INVENTION

Figure 1A:
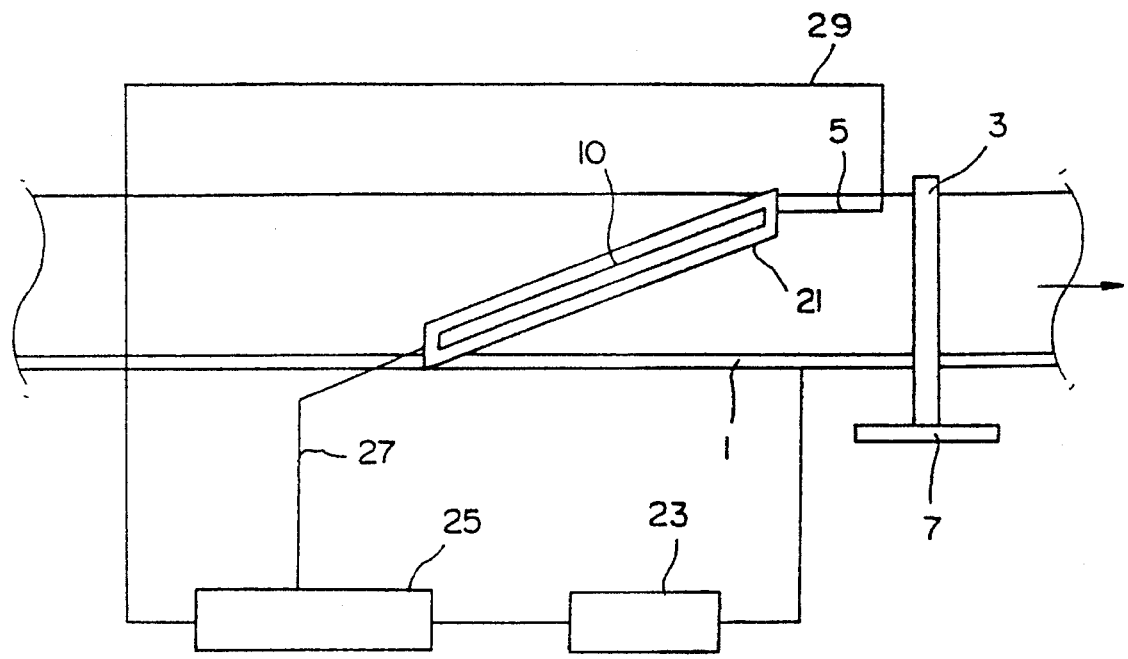

FIG. 1A is a cross-sectional view showing a head array and its control structure according to an embodiment of the present invention. As shown in FIG. 1A, a capstan motor 3 moves a tape 5. Moreover, a pulse generator 7 transfers pulses occurring when motor 3 is rotated to a control unit and receives the control signals controlling a rotation of motor 3 with feedback signals so that a moving speed of the tape is controlled.

A head array 10 is inclined at 6° with respect to tape 5 and the angle is the same as the typical helical scanning angle of a tape. The head array 10 is described in detail in FIGS. 2A and 2B.

The head array 10 comprises two long blocks 12 and 14 formed on a ceramic substrate 13 by a semiconductor manufacturing technology. A plurality of head gaps comprise pairs of recording and reproducing head gaps 15 and 17 and each of the pairs of head gaps 15 and 17 is arranged at a distance from each other. Each of the pairs of head gaps 15 and 17 is symmetrically formed at the azimuth angle on each of the blocks 12 and 14 with respect to the tape 5. Moreover, although each of blocks 12 and 14 corresponding to right(R) and left(L) heads arranged at the head drum for the typical helical scanning method, each of blocks 12 and 14 is operated at the same time in a different way from the helical scanning method.

In an embodiment of the present invention, the head array 10 comprises one hundred ten (110) pairs of recording and reproducing head gaps 15 and 17.

Figure 3:
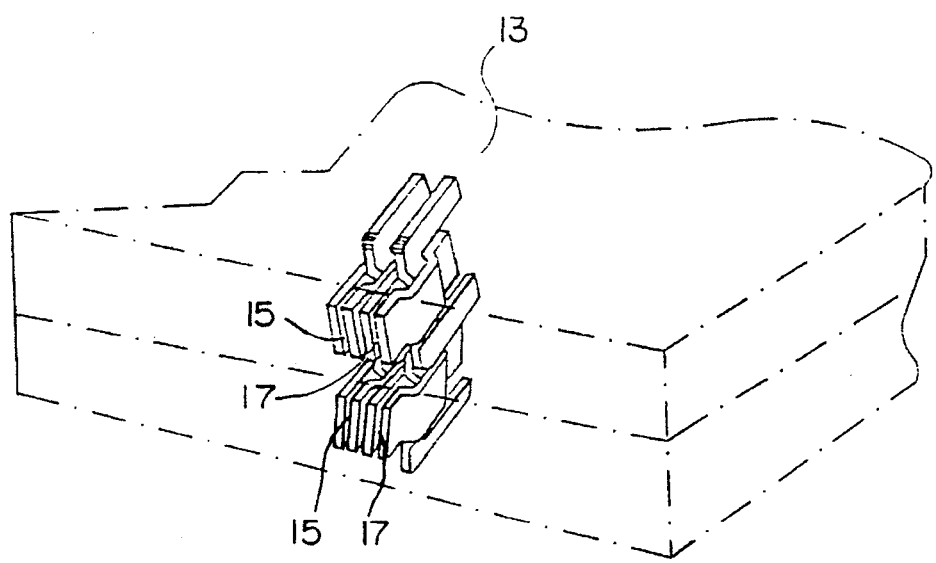
FIG. 3 is an enlarged view showing head gaps of FIG. 2B.

FIG. 3 is an enlarged view for showing an arrangement of head gaps of a head array manufactured as a thin film by a semiconductor manufacturing process. As shown in FIG. 3, the recording and reproducing head gaps 15 and 17 are formed on a substrate 13 at a certain distance from each other. When recorded by recording head gap 15 and reproduced by reproducing head gap 17, head gaps 15 and 17 are in contact with tape 5 so that signals are recorded and reproduced.

These head gaps 15 and 17 are arranged in a certain interval equivalent to each of multiple horizontal synchronization durations included within a vertical synchronization interval. That is, this head gap interval corresponds to a distance scanning two line signals of a single field image recorded on a track. Therefore, since each of the pairs of head gaps 15 and 17 arranged on each of blocks 12 and 14 scans a track by two lines, each of blocks 12 and 14 scanning the track records and reproduces an image of two hundred twenty lines at the same time. These image signals of 220 lines are used as a single field according to an embodiment of the present invention.

Figure 6:
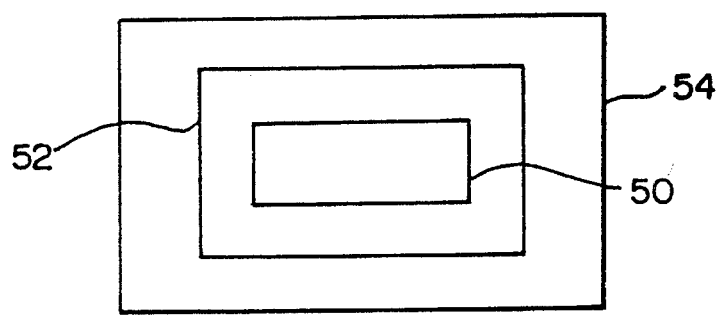
FIG. 6 is a view illustrating a format of a composite image signal in connection with a cathode ray tube display.

Referring to FIG. 6, in case of NTSC system, signal regions between a cathode ray tube(CRT) display 50 and image information is illustrated. The number of scanning lines for each of even numbered and odd numbered fields is 262.5 respectively and scanning time for each line is 63.6 msec. As in region 52, 241.5 scanning lines are used as scanning lines of image information, exclusive of lines for a portion of vertical synchronizing signals, and scanning time for each line is 53 msec.

However, only 217.5 lines are used as scanning lines for actual effective image signals to be revived in the CRT display 50, exclusive of lines for overscan portion, and scanning time for each line is 48 msec.

If the number of scanning lines are over 217.5, single field (half frame) is formed. Therefore, a field and a frame consist of 220 lines and 440 lines, respectively, according to an embodiment of the present invention.

Figure 1B:
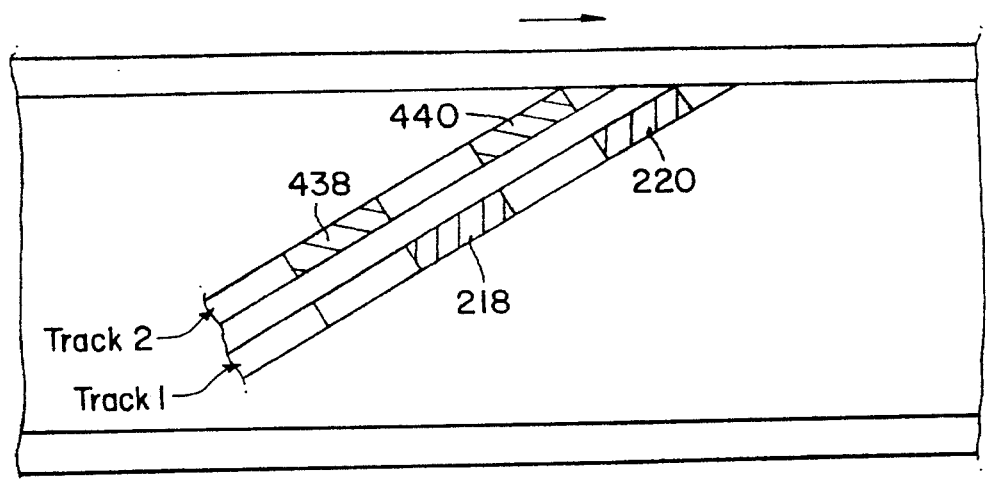

Referring to FIGS. 1A, 1B and 1C, the head gaps 15 and 17 arranged on head array 10 record and reproduce signals through a phase control unit for recording and reproducing the signals on the track formed on the tape 5. When the tape 5 is moved, head array 10 turns down according to a motion of the tape 5 and then turns up so that each of the pairs of head gaps 15 and 17 of head array 10 scans a region equivalent to two line signals within the track.

FIGS. 1B and 1C illustrate scanning operations of the head array 10 according to an embodiment of the present invention. As shown in FIG. 1B, the head array 10 scans image signals on track 1 and track 2 formed on the tape 5 at a regular position. Each of head blocks 12 and 14 is arranged to be corresponded with the tracks 1 and 2.

In the scanning method according to an embodiment of the present invention, 220 head gaps scan a region corresponding to half lines of tracks 1 and 2, for example, even numbered lines such as 2nd, 4th, 6th, ..., 218th, 220th, ..., 438th, and 440th lines. Thereafter, the tape 5 is moved (moved in the right direction in the drawing) and head array 10 is vertically moved down. In such a case, as shown in FIG. 1C, the head gaps 15 and 17 of the head array 10 scan a region corresponding to odd numbered lines such as 1st, 3rd, 5th, ..., 217th, 219th, ..., 437th, and 439th lines of the tracks 1 and 2. As mentioned above, as two tracks are scanned two times, one frame is completed. Therefore, after two tracks have been scanned, head array 10 recovers to the original position. For achieving this object, an actuator 21 for driving the head array 10 is provided. As shown in FIGS. 2A and 2B, the actuator 21 is a piezoelectric device attached to a ceramic substrate 13.

Actuator 21 made of laminated ceramic has a polarization direction when it is manufactured. In case that an electric field direction occurring by a driving voltage coincides with the polarization direction, the piezoelectric device 21 is expanded in the polarization direction. Otherwise, if the electric field direction is opposite to the polarization direction, the piezoelectric device 21 is contracted to the polarization direction. The head array 10 related to the actuator 21 is vertically moved downward and upward during a time period corresponding to a proceeding time period of a track past one-row head gaps. Therefore, the head array 10 is constituted on a quasi-fixed head moving downward and upward rather than a rotating motion of head in the conventional helical scanning system.

A phase comparator 23 and a piezo driving circuit 25 control the actuator 21 to eliminate a phase difference between a track of the tape 5 and the head array 10. While recording and reproducing, the phase comparator 23 offers an output of a phase control signal by using its reference phase signal and a control signal coming out from the phase control track of the tape. The piezo driving circuit 25 transfers the phase control signal transferred from the phase comparator 23 as a voltage signal to actuator 21 through the wires 27 and 29. A downward moving signal for the head array 10 occurs when a rising edge of a clock pulse appears.

Figure 4:
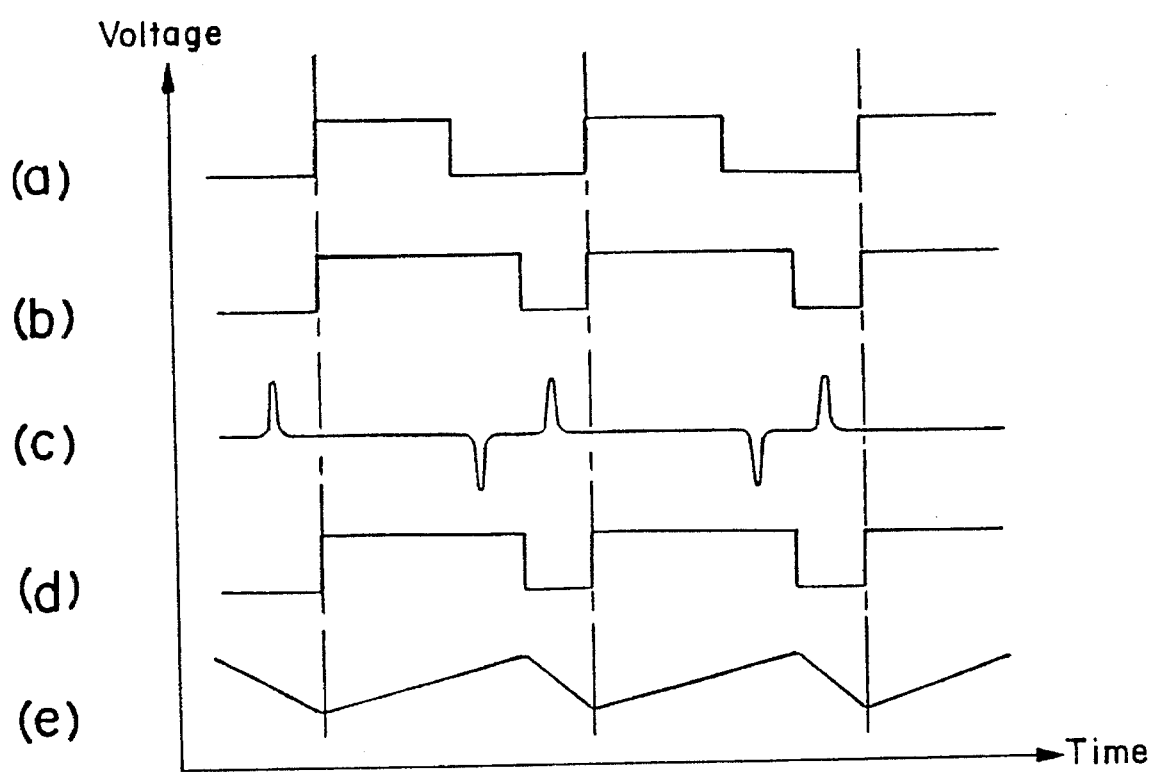
FIG. 4 is timing signal views for phase controls of a head array of FIG. 1A.

Referring to FIG. 4, the timing signal views for phase controls are illustrated. The pulse signal in (a) of FIG. 4 is a clock pulse of the phase comparator 23. When a recording is started, a downward moving signal of head array 10 occurs in piezo driving circuit 25 on the basis of the rising edge of the clock pulse. Moreover, a recovering signal (a rising signal) of the head array 10 occurs at an appropriate time before the rising edge of the above clock pulse((e) of FIG. 4). the recording control signal that has occurred during recording ((b) of FIG. 4) is recorded on the control track 1 of a tape by an ordinary control head (not shown).

When a reproducing is started, a reproducing control signal ((c) of FIG. 4) is transferred to the phase comparator 23 from the control track 1. This reproducing control signal is transformed to a step signal at the rising edge of the clock pulse shown in (a) of FIG. 4. The downward moving signal of the head array 10 occurs on the basis of the rising edge of the clock pulse as described in case of recording.

In a desirable embodiment of the present invention, a half inch (8 mm) video tape is used and other parameters are as follows:

Tape Velocity: 33.5 mm/sec

Track pitch: 58 μm

Head gap pitch: 742 μm

Efficient gap width: 25 μm

Alternating time period of the head array: 33.3 msec

Scanning time of one frame; 22.1 msec

In the above parameters, the tape velocity and track pitch are identical to those of a helical scanning system.

Figure 5:
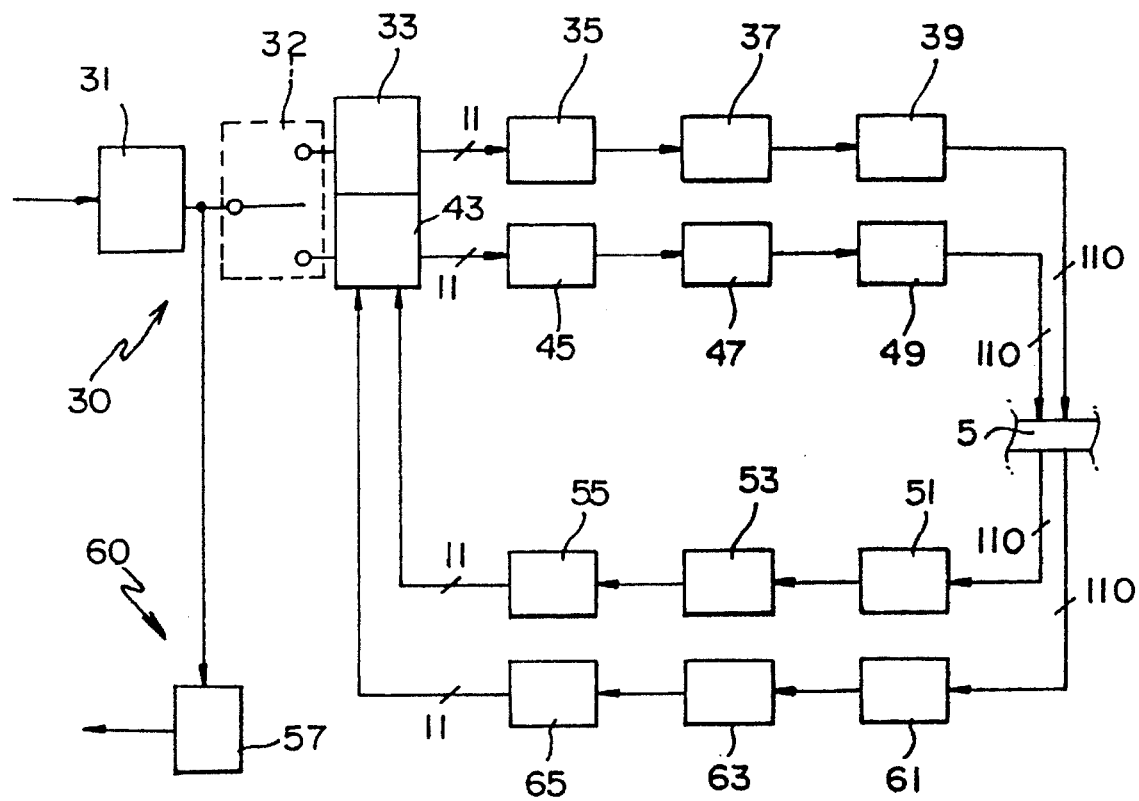
FIG. 5 is a block diagram of an image signal processing unit of an image signal recording and reproducing apparatus having a quasi-fixed head according to an embodiment of the present invention.

FIG. 5 is a brief block diagram for illustrating an image signal processing apparatus for a VCR system having a quasi-fixed head.

This image signal processing apparatus comprises two parts which are an image signal recording processing part 30 and an image reproducing processing part 60. The image signal recording processing part 30 comprises an analog/digital (A/D) converter 31, a switch 32, field memories 33 and 43, multiplexer parts 35 and 45, digital/analog(D/A) converter parts 37 and 47, and recording amplifier parts 39 and 49.

The A/D converter 31 of image signal recording processing part 30 transfers to field memories 33 and 43 an A/D-converted signal of a composite image signal inputted through a tuner and the exterior. At this time, A/D converter 31 converts to a digital signal an image signal only for an image in which horizontal and vertical synchronization signals and an overscan signal have been eliminated from a composite image signal. A sampling frequency for an A/D conversion of a composite image signal is four times of an FM carrier frequency, which is about 14.3 MHz.

The field memories 33 and 43 are for temporarily storing an A/D-converted image signal corresponding to each of even numbered field and odd numbered field separated by operations of the switch 32 as well as for temporarily storing a digital image signal reproduced from image signal reproducing processing part 60. In case of the NTSC television system, in order to reduce a capacity of each of the memories 33 and 43, each of field memories 33 and 43 has only a capacity for storing 220 line signals, as mentioned above, desirably a memory capacity of 2 M byte.

Image signals stored in each of field memories 33 and 43 is accessed by eleven (11) line signals at one time which are outputted through eleven channels. Each of the eleven channels transmits successively data corresponding to twenty lines.

Describing in detail, a 1st channel related to field memory 33 transmits image signals from a first line signal to a 20th line signal, a second channel from a 21st line signal to 40th line signal, and so on. Therefore, the last 11th channel transmits image signals from a 201st line signal to a 220th line signal. This method is applied to the channels related to another field memory 43 in the same way as mentioned above. In such a case, the line signals related to each channel are transmitted in a line sequence and digital signals, which are digital bits, of each line signal are sequentially transmitted. That is, the 1st channel transmits in series all 1st bits of the digital bits from the 1st line signal to the 20th line signal sequentially. After all the 1st bits have been transmitted, all 2nd bits are transmitted sequentially in the same way as mentioned above. The transmission manner is applied in the same way as mentioned above to the rest of of the channels from the 2nd to the 20th channels and eleven digital bits are transmitted in parallel at the same time.

The digital image signals transmitted through each of the channels from field memories 33 and 43 is applied to multiplexer parts 35 and 45. Each of the multiplexer parts 35 and 45 is made of eleven multiplexers (MUX) each of which is connected to each of the channels. Each multiplexer has a function of 1 input-10 output, which selectively outputs 10 digital image signals by a control signal of a control unit. In case that digital image signals of two hundred twenty lines is transmitted two times through the channels, multiplexer parts 35 and 45 generate multiplexed digital image signals corresponding to one frame. One frame image signals of multiplexer parts 35 and 45 does not mean one typically complete frame image signals, but one frame image signals corresponding to four hundred forty line signals according to an embodiment of the present invention. One hundred ten output signals occurred from each of multiplexer parts 35 and 45 corresponds to the number of recording head gaps 15 of the head array 10 as shown in FIGS. 2A and 2B. The 110 digital image signals occurring from each of multiplexer parts 35 and 45 are transmitted to each of D/A converter parts 37 and 47.

Each of D/A converter parts 37 and 47 comprises 110 D/A converters, and each of the D/A converters is constituted to receive digital image signals which are transmitted from each of the multiplexers. That is, each of D/A converters receives the digital image signals by one line and converts the digital image signal into analog signals which can be recorded on a tape. The converted analog signals are applied to recording amplifier parts 39 and 49 which are connected to D/A converter parts 37 and 47, respectively.

Each of recording amplifier parts 39 and 49 comprises 110 recording amplifiers, respectively. Each of the amplifiers amplifies signals of a very low voltage level, which are provided through D/A converter parts 37 and 47, to such an extent of being a level capable of being recorded on a tape. These amplified signals are provided to blocks 12 and 14 of the head array 10. Recording head gaps 15, which are arranged in each of blocks 12 and 14, record image signals in a minute time difference corresponding to two lines per one head gap while the tape is running. When the tape has proceeded as long as a length corresponding to an area of two tracks, image signals corresponding to each of two fields are recorded on each of helical tracks of the tape. As the above mentioned recording is repeated, image signals corresponding to other two fields are recorded on next two tracks of the tape, and so forth.

Next, reproducing procedures for the image signals recorded on a tape will be disclosed. The image signal reproducing processing part 60 comprises reproducing amplifier parts 51 and 61, A/D converter parts 53 and 63, multiplexer parts 55 and 65, field memories 33 and 43, and a D/A converter 57 in order to reproduce image signals which are picked up by reproducing head gaps 17 of the head array 10 shown in FIGS. 2A and 2B. Each of 110 reproducing amplifiers of reproducing "amplifier parts 51 and 61 of reproducing amplifier parts 51 and 61 is connected to each of gaps 17 which are arranged in head blocks 12 and 14.

Amplifiers disposed in each of the reproducing amplifier parts 51 and 61 compensate amplitude characteristics of high band frequency components of the image signals picked up from the tape. The compensated image signals are transmitted to A/D converter parts 53 and 63. Each of A/D converter parts 53 and 63 comprises 110 A/D converters and converts an amplified analog signal from the tape to a digital signal. The converted digital signal is transmitted to multiplexer parts 55 and 65.

Each of multiplexer parts 55 and 65 comprises 11 multiplexers, each of which, in contrast to multiplexer parts 35 and 45 of image signal recording processing part 30, receives ten compensated signals, under a proper control of a control unit (not shown), as a 10 inputs—1 output multiplexer, and produces one output signal. Outputs of multiplexer parts 55 and 65 are transmitted through 11 channels to field memories 33 and 43.

Each of the field memories 33 and 43 comprises image signals of one field sequentially corresponding to 220 lines from a 1st line to a 220th line. The image signals in each of field memories 33 and 43 are supplied to D/A converter 57 in the order of even numbered field or odd numbered field by a switch 32. Therefore, as described above, a VCR system having a quasi-fixed head of the present invention maintains a compatibility with a conventional helical scanning type VCR system by using an MR head. Also, the present invention provides simplicity of the driving and controlling mechanism of the head array with a reduced size thereof.

Although this invention has been described in its preferred form with a certain degree of particularity, it will be appreciated by those skilled in the art that the present disclosure of the preferred form has been made only by way of example and that numerous changes in the details of the construction, combination and arrangement of parts may be restored to without departing from the spirit and scope of the invention.

What is claimed is:

1. An apparatus for recording and reproducing an image signal on and from tracks of a tape, said apparatus comprising:

a head array having blocks of a plurality of head gaps which are arranged in a stepwise manner and having an inclination with a predetermined angle to the tape;

a servo control means for moving said head array downwards and upwards so as to scan said tape, said servo control means having an actuator attached to said head array, a phase comparator for comparing a phase between said head array and said tracks of said tape to produce a comparison result and a piezo driving means for supplying a driving voltage to said actuator in accordance with the comparison result, said actuator reciprocating said head array upwards and downwards periodically; and a signal processing apparatus for recording said image signal on said tracks of said tape by said head array and reproducing said image signal from said tracks of said tape in which said image signal is recorded.

2. The apparatus of claim 1, wherein said actuator moves said head array in a vertical direction downward from an original position with respect to a tape lengthwise direction and then moves a next corresponding head array upwards to the original position so that one of said blocks of head gaps in said head array scans a corresponding track.

3. The apparatus of claim 2, wherein said actuator returns said head array to the original position during a retrieving duration of a horizontal synchronization signal.

4. The apparatus of claim 2, wherein said blocks of said head array respectively scan said tracks and a pair of said head gaps of said blocks scans respectively two horizontal line signals equivalent to two horizontal synchronization durations.

5. The apparatus of claim 2, wherein said actuator includes a piezo electric element which is expanded to a polarization direction when a direction of an electric field occurring by the driving voltage supplied from said piezo driving means is correspondent with the polarization direction.

6. The apparatus of claim 1, wherein a minor displacement to a track width direction is caused by said piezo driving means during a duration equivalent to a track processing duration of each of said head gaps.

7. The apparatus of claim 1, wherein said signal processing apparatus comprises an image signal recording processing apparatus including:

a first A/D converter for converting composite analog image signal input as a real time base to a first digital image signal;

a first memory means for memorizing said first digital image signals for outputting said first digital image signals as multiple parallel series of horizontal line signals through a plurality of channels;

a first multiplexing means for multiplexing said multiple parallel series of horizontal line signals so as to generate multiplexed digital image signals corresponding to one frame and having a same number as that of said head gaps;

a first D/A converting section for converting said multiplexed digital image signals to first analog signals to be recorded on the tape;

an amplifying means for amplifying said first analog image signals and outputting said amplified first analog image signals to said head gaps of said head array and an image signal reproducing processing apparatus including:

an amplifying means for amplifying second analog image signals which are simultaneously detected from said tape by said head array;

a second A/D converting section for converting said amplified second analog image signals to second digital image signals;

a second multiplexing means for multiplexing said second digital image signals;

a second memory means for memorizing said second digital image signals and for outputting said second digital image signals sequentially per a line;

a second D/A converting section for converting said second digital image signals from said second memory means into second analog image signals and for outputting said second analog image signals to an external terminal.

8. The apparatus of claim 7, said signal processing means further comprising a second signal processing means for processing an odd field signal or an even field signal of said composite analog image signal alternatively.

9. The apparatus of claim 7, said apparatus further comprising a switching means for dividing a frame image signal of said composite analog image signal into an odd field signal or even field signal.

\* \* \* \* \*